Nov. 14, 1950      A. J. SCHAID      2,530,268
TAPPING APPARATUS
Filed Aug. 14, 1945
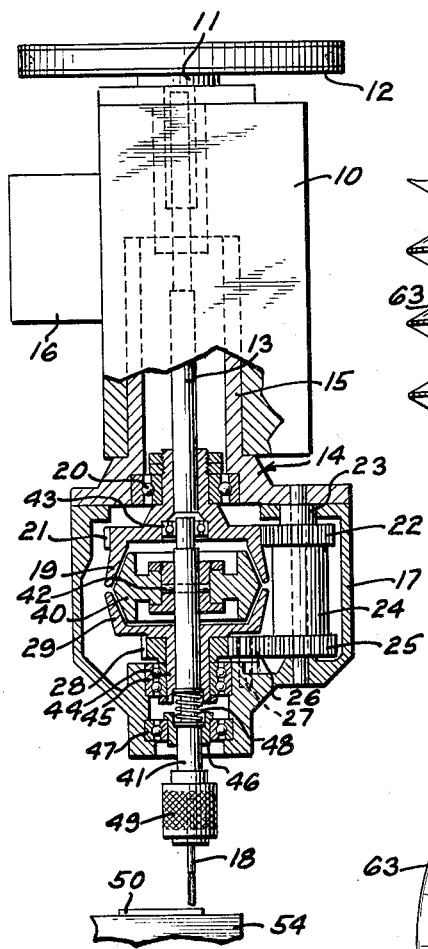
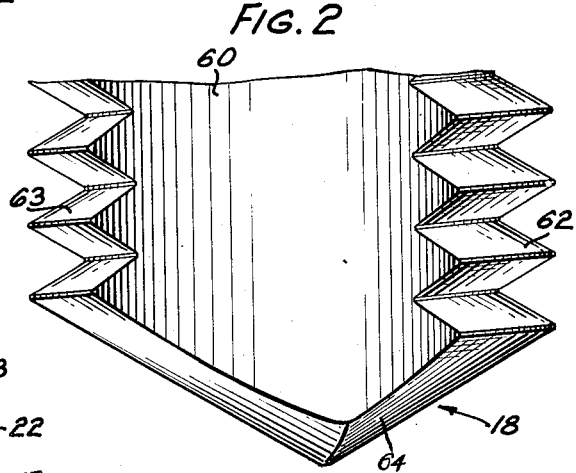
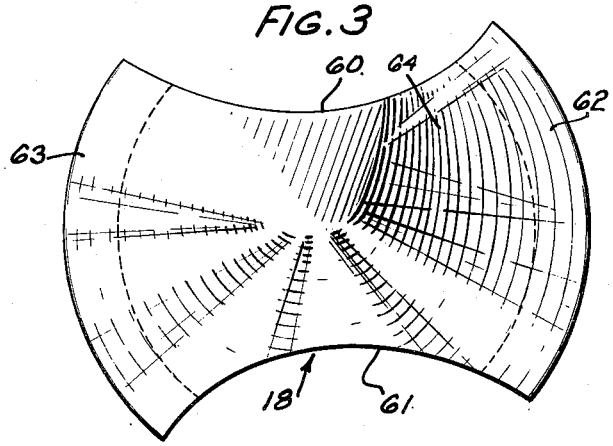
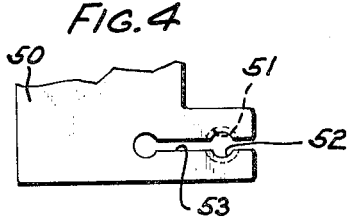
INVENTOR.
A. J. SCHAID
BY
Harry R. Duft
ATTORNEY Patented Nov. 14, 1950

2,530,268

UNITED STATES PATENT OFFICE 2,530,268

TAPPING APPARATUS

Arthur J. Schaid, Chicago, Ill., assignor to Western Electric Company, Incorporated, New York, N. Y., a corporation of New York Application August 14, 1945, Serial No. 610,691

3 Claims. (Cl. 10—141)

This invention relates to tapping apparatus and more particularly to a tap for tapping rounded notches in slots or retapping previously threaded holes.

It is an object of the present invention to provide a tapping apparatus for producing burr-free threads.

In accordance with one embodiment of the invention, a tap made similar to a standard bottom tap, is ground at its entrance end in such manner that the tip or entrance end surface starts at the same helical angle as the first full thread and continues for a complete revolution around the tip of the tap, whereby, after the first revolution, the first cutting edge or tooth cuts a full thread and forms a heavy chip which will not tend to adhere to the threads. The tap is mounted in a drive mechanism, which is responsive to pressure in opposite directions to drive the tap in a direction depending upon the direction that pressure is applied to the tap.

A complete understanding of the invention may be had by reference to the following detailed description when considered in conjunction with the accompanying drawing, wherein Fig. 1 is a front elevational view of a tapping apparatus made in accordance with the present invention, parts being broken away to show details of the drive mechanism for the tap;

Fig. 2 is a greatly enlarged view of the entrance end surface of the tap;

Fig. 3 is a bottom plan view showing the entrance end surface of the tap; and

Fig. 4 is a fragmentary detail view of a part which may be readily threaded by using the tap shown in the other figures.

In the drawings, the tapping apparatus is shown provided with an upper housing 10, from which there extends a drive shaft 11 carrying a pulley 12, which may be driven from any suitable power source, not shown. The drive shaft 11 is splined to a shaft 13, thus to rotate the shaft 13 when the shaft 11 is driven, but to permit relative reciprocation between the shafts 11 and 13. A lower housing 14, having a cylindrical projection 15 thereon, is slidable with respect to the upper housing 10 and is fixed against rotation with respect thereto. Any suitable means may be provided for imparting reciprocation to the lower housing 14, for example, a pneumatic control device, illustrated diagrammatically at 16.

The lower housing 14 includes a casing 17, in which suitable gearing is provided for imparting rotation to a tap 18. Attached to the lower end of the splined shaft 13 is an upper driving clutch member 19, which is journalled in a bearing 20 set into the lower housing 14. The upper driving clutch member has a gear 21 cut into its periphery to mesh with a gear 22 rotatable on a fixed shaft 23 which is, in turn, mounted within the casing 17 of the housing 14. The gear 22 is attached to a sleeve 24, which, in turn, has a gear 25 fixed to its lower end in position to mesh with an intermediate gear 26 mounted on a stud shaft 27. Meshing with the intermediate gear 27 is a gear 28, which is fixed to a lower driving clutch member 29.

The upper and lower driving clutch members are of substantially the same construction and have opposed internal faces positioned to be engaged by a double cone driven clutch member 40, which is keyed to a tap driving shaft 41 by means of a pin 42. The shaft 41 has its upper end rotatably mounted in a bearing 43 set into the upper driving clutch member and is freely rotatable in a sleeve 44 formed integrally with the lower driving clutch member which is, in turn, rotatably mounted in a bearing 45 set into the casing 17. A shouldered collar 46 surrounds the tap driving shaft 41 and is rotatable in a bearing 47 set into the lower end of the casing 17. The collar 46 serves to support a compression spring 48, which surrounds a reduced portion of the tap driving shaft, and serves to resiliently hold the tap driving shaft 41 in the position shown in Fig. 1, where the driven clutch member 40 will be out of engagement with the driving clutch members 19 and 29.

The weight of the tap driving shaft 41, driven clutch member 40 and chuck 49 which holds the tap 18 on the shaft 41, are sufficient to hold the driven clutch member out of engagement with the driving clutch member 19 and the spring 48 is sufficiently strong to hold the driven clutch member 40 out of engagement with the driving clutch member 29. However, when the tap 18 is moved downwardly under control of the pneumatic control device 16 to engage the end of the tap with an article 50, the tap 18, on engaging the article, will resist downward movement and, as the lower housing 14 continues to move downwardly, the driving clutch member 19 will engage with the driven clutch member 40 to drive the tap in a direction to cut a thread 51 in the rounded notches 52 at the sides of the slot 53 formed in the article 50. The article 50 may be supported on any suitable base 54.

As soon as the thread 51 is tapped in the sides of the slot 53, the pneumatic control device 16 may be operated to cause the lower housing 14 to move upwardly. As soon as the housing 14 starts to move upwardly, the driven clutch member 40 will be disengaged from the upper driving clutch member 19 and continued movement upwardly of the housing 14 will cause the clutching faces of the lower driving clutch member 29 and driven clutch member 40 to engage and reverse the direction of rotation of the tap 18 until the tap is disengaged from the slot which it has threaded, at which time the spring 48 will restore the driven clutch member 40 to its middle position, as shown in Fig. 1, to stop further rotation of the tap due to the unclutching of the driven clutch member from both of the driving clutch members. The gearing extending from the gear 21 through gears 22, 25, 26 and 28 is such that engagement of the driven clutch member 40 with the upper driving clutch member causes the tap to be rotated in one direction, whereas the engagement of the driven clutch member 40 with the lower clutch member 29 causes the tap to be rotated in the opposite direction.

From the foregoing, it will be seen that the tap 18 is resiliently engaged with the article to be tapped and that the clutching of the tap to its actuator must result in some slight slippage at the beginning of the clutching of the two clutch members one to another. This will permit the tap to be rotated slightly under either the urging of gravity or the spring 48 so that the tap will be permitted to drop into the slot 53 before it starts to cut. This is necessary since the entrance end of the tap and the first cutting tooth of the tap will, in the first complete revolution of the tap after it is dropped into the slot 53, cut one complete thread.

By referring to Figs. 2 and 3, it will be seen that the tap 18 has oppositely disposed flutes 60 and 61 formed in it, between which are lands 62 and 63. The entrance end surface 64 of the tap has everywhere at radial sections an angle equal to the thread angle and recedes axially away from said end on a helix equal to the thread helix angle, thus providing a generally coned surface with its apex eccentric to the tap axis and this surface is a continuation of the first thread adjacent thereto. The entrance end surface 64 of the tap thus consists of a prolongation of the first thread and, since the thread is helically formed at the tip of the tap, the extension or prolongation of the thread surface merges to form an irregular surface, the extreme tip end of which is eccentric with respect to the longitudinal axis of the tap and comprises a curved edge. In tapping operations, the farthest extending portion of the tap will thus engage with the edge of the slot 53 to be tapped and will hold the threads out of cutting relation with the material of the article to be tapped until the flutes 60 and 61 are substantially parallel to the edges of the slot, thus to permit the entrance end surface 64 of the tap to drop into the slot and begin cutting the thread. Accordingly, when resiliently engaged with the surface of a part at the edge of the hole to be tapped, the tap 18 will not cut the part until it has dropped into the slot 53 and will then, in the first full revolution, cut a thread to the full depth of the major diameter of the tap. Obviously, this first thread cut in the part will not be complete, in that it will not include the full thread angle, due to the engagement of the entrance end surface 64 of the tap at the point diametrically opposed to the cutting face with the edge of the notch 52. However, after the first revolution, the tap will cut a full thread in each revolution thereof.

What is claimed is:

1. A screw thread-cutting tool comprising a tap having its entrance end defined by a surface having everywhere at radial sections an angle equal to the thread angle and receding axially away from said end and on a helix equal to the thread helix angle providing a generally coned surface with its apex eccentric to the tap axis and this surface being a continuation of the first thread adjacent thereto, and having the first thread-cutting surface extending to the major diameter of the tap thread to cut a full thread for each complete revolution following the first revolution.

2. A screw thread-cutting tap for retapping or tapping opposed edges of slots having longitudinally extending flutes defining lands and an entrance end defined by a surface having everywhere at radial sections an angle equal to the thread angle and receding axially away from said end and on a helix equal to the thread helix angle providing a generally coned surface with its apex eccentric to the tap axis and this surface being a continuation of the first thread adjacent thereto, and a thread-cutting tooth formed at the entrance end of said tap to conform to the maximum major and minor diameter of the tap.

3. A fluted screw thread-cutting tap for tapping opposed notched edges of slots in articles having its entrance end defined by a surface having everywhere at radial sections an angle equal to the thread angle and receding axially away from said end and on a helix equal to the thread helix angle providing a generally coned surface with its apex eccentric to the tap axis and this surface being a continuation of the first thread adjacent thereto.

ARTHUR J. SCHAID.

REFERENCES CITED

The following references are of record in the file of this patent:

UNITED STATES PATENTS

| Number | Name | Date |
|---|---|---|
| 270,216 | French | Jan. 9, 1882 |
| 568,277 | Roll | Sept. 22, 1896 |
| 909,437 | Mercier | Jan. 12, 1909 |
| 1,549,178 | Bishop | Aug. 11, 1925 |
| 2,336,478 | Goldberg | Dec. 14, 1943 |
| 2,386,897 | Johnson | Oct. 16, 1945 |

FOREIGN PATENTS

| Number | Country | Date |
|---|---|---|
| 4,271 | Great Britain | Dec. 11, 1874 |